US009457788B2

(12) United States Patent
Yukawa et al.

(10) Patent No.: US 9,457,788 B2
(45) Date of Patent: Oct. 4, 2016

(54) ELECTROMOTIVE DRIVE DEVICE USED IN ENGINE-DRIVEN VEHICLE

(71) Applicant: PANASONIC CORPORATION, Osaka (JP)

(72) Inventors: Junichi Yukawa, Nara (JP); Yoshihide Nii, Aichi (JP)

(73) Assignee: PANASONIC CORPORATION, Osaka (JP)

( * ) Notice: Subject to any disclaimer, the term of this patent is extended or adjusted under 35 U.S.C. 154(b) by 0 days.

(21) Appl. No.: 14/764,147

(22) PCT Filed: Mar. 3, 2014

(86) PCT No.: PCT/JP2014/001145
§ 371 (c)(1),
(2) Date: Jul. 28, 2015

(87) PCT Pub. No.: WO2014/162656
PCT Pub. Date: Oct. 9, 2014

(65) Prior Publication Data
US 2016/0031429 A1     Feb. 4, 2016

(30) Foreign Application Priority Data

Apr. 2, 2013   (JP) .................. 2013-077110

(51) Int. Cl.
*B60W 20/00*  (2016.01)
*B60W 10/06*  (2006.01)
(Continued)

(52) U.S. Cl.
CPC ............. *B60W 10/06* (2013.01); *B60K 6/44* (2013.01); *B60K 6/48* (2013.01); *B60K 6/485* (2013.01);
(Continued)

(58) Field of Classification Search
USPC ......... 701/22; 105/50, 61; 180/65.31, 65.26, 180/65; 903/907, 903
See application file for complete search history.

(56) References Cited

U.S. PATENT DOCUMENTS 5,495,906 A      3/1996  Furutani
6,488,107 B1 *  12/2002  Ochiai ............... B60K 6/48
                                                      180/65.25

(Continued)

FOREIGN PATENT DOCUMENTS

DE   10 2011 017260 A1   10/2012
JP        2007-236109 A    9/2007

(Continued)

OTHER PUBLICATIONS

Characterization of advanced drive system for hybrid electric vehicles; Wei Xu; Jianguo Zhu; Yongchang Zhang; Yi Wang; Guangyong Sun; Electrical Machines and Systems (ICEMS), 2010 International Conference on; Year: 2010; pp. 487-492.*

(Continued)

*Primary Examiner* — Cuong H Nguyen
(74) *Attorney, Agent, or Firm* — McDermott Will & Emery LLP (57) ABSTRACT

An electromotive drive device including a small motor and a small-capacity battery more effectively improves the fuel economy of an engine-driven vehicle. An electromotive drive device includes: a motor for driving a vehicle; a battery storing electrical energy to rotate the motor; an inverter; a converting mechanism transmitting rotation of the motor to a drive shaft at a predetermined conversion ratio independently of a conversion ratio at which an engine is driven; and a control unit controlling an operation of the inverter. The control unit is configured so that upper vehicle speed limits, to which the motor is allowed to operate, can be set separately during powering and during regeneration, respectively.

6 Claims, 10 Drawing Sheets

(51) Int. Cl.

| | | |
|---|---|---|
| *B60K 6/52* | (2007.10) | |
| *B60L 11/14* | (2006.01) | |
| *B60W 10/08* | (2006.01) | |
| *B60L 11/18* | (2006.01) | |
| *B60L 15/20* | (2006.01) | |
| *B60K 6/44* | (2007.10) | |
| *B60K 6/48* | (2007.10) | |
| *B60K 6/485* | (2007.10) | |
| *B60K 17/356* | (2006.01) | |
| *B60K 23/08* | (2006.01) | |
| *B60L 7/18* | (2006.01) | |
| *B60L 11/00* | (2006.01) | |
| *B60L 11/12* | (2006.01) | |
| *B60W 10/26* | (2006.01) | |
| *B60K 1/00* | (2006.01) | |

(52) U.S. Cl.
CPC ............... *B60K 6/52* (2013.01); *B60K 17/356* (2013.01); *B60K 23/0808* (2013.01); *B60L 7/18* (2013.01); *B60L 11/00* (2013.01); *B60L 11/123* (2013.01); *B60L 11/14* (2013.01); *B60L 11/1814* (2013.01); *B60L 11/1861* (2013.01); *B60L 11/1868* (2013.01); *B60L 15/2009* (2013.01); *B60W 10/08* (2013.01); *B60W 10/26* (2013.01); *B60W 20/00* (2013.01); *B60W 20/106* (2013.01); *B60K 2001/001* (2013.01); *B60K 2023/0833* (2013.01); *B60L 2210/10* (2013.01); *B60L 2210/40* (2013.01); *B60L 2220/14* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2260/28* (2013.01); *B60L 2270/145* (2013.01); *B60W 2520/10* (2013.01); *B60W 2710/081* (2013.01); *Y02T 10/623* (2013.01); *Y02T 10/6265* (2013.01); *Y02T 10/645* (2013.01); *Y02T 10/70* (2013.01); *Y02T 10/7005* (2013.01); *Y02T 10/7044* (2013.01); *Y02T 10/7066* (2013.01); *Y02T 10/7077* (2013.01); *Y02T 10/7216* (2013.01); *Y02T 10/7241* (2013.01); *Y02T 10/7275* (2013.01); *Y10S 903/93* (2013.01)

(56) References Cited

U.S. PATENT DOCUMENTS

| | | | |
|---|---|---|---|
| 7,273,120 B2 * | 9/2007 | Tabata | B60K 6/365 180/65.265 |
| 7,325,498 B2 * | 2/2008 | Kumar et al. | 105/35 |
| 8,744,712 B2 * | 6/2014 | Tashiro | B60L 7/18 303/152 |
| 2004/0200654 A1 | 10/2004 | Hatsuda et al. | |
| 2005/0103551 A1 | 5/2005 | Matsuno | |
| 2010/0324768 A1 | 12/2010 | Besnard et al. | |
| 2014/0229048 A1 * | 8/2014 | Kawata et al. | 701/22 |
| 2015/0006000 A1 * | 1/2015 | Kawata et al. | 701/22 |
| 2015/0174998 A1 * | 6/2015 | Okada | B60K 6/46 701/22 |

FOREIGN PATENT DOCUMENTS

| | | |
|---|---|---|
| JP | 2007-331418 A | 12/2007 |
| JP | 2011-037359 A | 2/2011 |
| JP | 2011-255763 A | 12/2011 |

OTHER PUBLICATIONS

Mu Synthesis Robust Control on Regenerative Braking of Hybrid Power System Electric Vehicle; Yan Qun; Xu Peng; Yu Da-Tai; Tang Yong-Xin; Intelligent Human-Machine Systems and Cybernetics (IHMSC), 2013 5th International Conference on; Year: 2013, vol. 1; pp. 546-551, DOI: 10.1109/IHMSC.2013.136.*

New fully soft switched bi-directional converter for Hybrid Electric Vehicles: Analysis and control; Ahmadi, M.; Galvan, E.; Adib, E.; Farzanehfard, H.; IECON 2010—36th Annual Conference on IEEE Industrial Electronics Society; Year: 2010; pp. 2340-2345, DOI: 10.1109/IECON.2010.5675143.*

Z-source inverter for vehicular applications; Ellabban, O.; Van Mierlo, Joeri; Lataire, Philippe; Van Den Bossche, P.; Vehicle Power and Propulsion Conference (VPPC), 2011 IEEE; Year: 2011; pp. 1-6, DOI: 10.1109/VPPC.2011.6043053.*

Research on Control Strategy for Regenerative Braking of a Plug-In Hybrid Electric City Public Bus; Li Yu-shan; Zeng Qing-liang; Wang Cheng-long; Wang Liang; Intelligent Computation Technology and Automation, 2009. ICICTA '09. Second International Conference on; Year: 2009, vol. 1; pp. 842-845, DOI: 10.1109/ICICTA.2009.210.*

International Search Report and Written Opinion, issued in corresponding International Application No. PCT/JP2014/001145 on May 27, 2014; 14 pages with partial English translation.

Extended European Search Report issued in corresponding European Patent Application No. 14779479.6, mailed on Apr. 1, 2016.

\* cited by examiner

ELECTROMOTIVE DRIVE DEVICE USED IN ENGINE-DRIVEN VEHICLE

RELATED APPLICATIONS

This application is the U.S. National Phase under 35 U.S.C. §371 of International Patent Application No. PCT/JP2014/001145, filed on Mar. 3, 2014, which in turn claims the benefit of Japanese Application No. 2013-077110, filed on Apr. 2, 2013, the disclosures of which Applications are incorporated by reference herein.

TECHNICAL FIELD

The present invention relates to an electromotive drive device including a motor and a battery, and more particularly relates to an electromotive drive device for use in an engine-driven vehicle.

BACKGROUND ART

In recent years, so-called "hybrid vehicles", each including an engine and a motor, have been popularized. Motors have advantages over engines, because motors achieve faster torque response, higher torque controllability, higher energy conversion efficiency, and less noise and vibration than engines. On the other hand, engines have their own advantages, because engines use petroleum fuel with high energy density and achieve a long cruising distance. Various techniques for hybrid vehicles have been and are being developed to take full advantage of an engine and a motor that are used in combination as a hybrid power source.

There are various types of hybrid vehicles, examples of which include series, parallel, and series-parallel hybrid vehicles, which are classified according to the method of coupling between a motor and an engine. A series hybrid vehicle is driven by a drive motor with an engine mechanically disengaged from wheels. Power is transmitted in series from the engine to a power generation motor, to a secondary battery, to the drive motor, and then to the wheels in this order. A parallel hybrid vehicle is driven by mechanically connecting a drive motor and an engine to wheels. Power is transmitted in parallel from the engine to a transmission and then to the wheels and from a secondary battery to the drive motor and then to the wheels. A series-parallel hybrid vehicle is a combination of the series hybrid type and the parallel hybrid type. Examples of series-parallel hybrid vehicles include a type in which power is changed by engagement and disengagement of a clutch and a power-split type in which the power distribution ratio is changed using a planetary gear.

Patent Document 1 discloses a parallel hybrid vehicle which includes an engine driving either one pair of wheels (namely, front wheels or rear wheels) and a motor driving the other pair, and in which a motor speed reduction gear transmitting the driving force of the motor to the wheels includes a switching mechanism engaging and disengaging a sleeve with/from a clutch gear.

CITATION LIST

Patent Document

PATENT DOCUMENT 1: Japanese Unexamined Patent Publication No. 2011-255763

SUMMARY OF THE INVENTION

Technical Problem

In the case of a parallel hybrid vehicle where power from an engine and power from a motor are transmitted in parallel to wheels, a high-capacity secondary battery is required to secure electric power for driving the motor. This has not only led to an increase in cost but also caused the problem of charge/discharge losses. Since there is a need to frequently operate the drive motor in a power generation mode in order to charge the battery, fuel economy has not always been sufficiently improved.

A configuration in which a non-drive shaft of an engine-driven vehicle is retrofitted with an electromotive assist drive device including a motor has also recently been provided. This electromotive drive device provides appropriate assistance in a situation where an engine cannot help resorting to a region having low thermal efficiency, e.g., when the vehicle has just started and is accelerating or when the vehicle is being driven at low speeds. That is to say, the motor output does not need to be so high, because assistance is intended to be provided to the point that motor-driven wheels help move a vehicle always travelling on engine-driven wheels. However, the present inventors discovered via experiments that fuel economy cannot always be sufficiently improved by simply using motor drive in such a configuration while the vehicle that has just started is accelerating or while the vehicle is being driven at low speeds.

It is an object of the present invention to improve the fuel economy of an engine-driven vehicle more effectively using an electromotive drive device including a small motor and a low-capacity battery.

Solution to the Problem

According to an aspect of the present invention, an electromotive drive device for use in an engine-driven vehicle includes: a motor for driving the vehicle; a battery storing electrical energy to rotate the motor; an inverter transforming power output from the battery into alternating current to supply the alternating current to the motor, and also transforming power regenerated by the motor into direct current to supply the direct current back to the battery; a control unit controlling an operation of the inverter; and a converting mechanism transmitting rotation of the motor to a drive shaft of the vehicle at a predetermined conversion ratio independently of a conversion ratio at which an engine is driven. The control unit is configured to set an upper vehicle speed limit, to which the motor is allowed to operate, to be higher during regeneration than during powering and/or to limit a maximum driving force of the motor more strictly during powering than during regeneration.

Optionally, the control unit may be configured to enable dynamic adjustment of at least one of the upper vehicle speed limit, to which the motor is allowed to operate, or the maximum driving force of the motor during powering and/or during regeneration.

Furthermore, the control unit may dynamically adjust at least one of the upper vehicle speed limit, to which the motor is allowed to operate, or the maximum driving force of the motor during powering and/or during regeneration in accordance with a piece of information on a state of charge (SOC) of the battery.

According to another aspect of the present invention, an electromotive drive device for use in an engine-driven vehicle includes: a motor for driving the vehicle; a battery storing electrical energy to rotate the motor; an inverter transforming power output from the battery into alternating current to supply the alternating current to the motor, and transforming power regenerated by the motor into direct current to supply the direct current back to the battery; and a converting mechanism transmitting rotation of the motor to a drive shaft of the vehicle at a predetermined conversion ratio independently of a conversion ratio at which an engine is driven. The predetermined conversion ratio is set so that if a rotational speed of the motor is maximum, the vehicle has a predetermined speed. The motor has a rated output of less than or equal to 15 kW. The battery has a rated capacity of less than or equal to 500 Wh. The predetermined speed is higher than 60 km/h and lower than 100 km/h.

In one embodiment, the predetermined speed may be 80 km/h.

Alternatively, the predetermined speed may be a half or less as high as a maximum speed of the engine-driven vehicle.

Advantages of the Invention

According to the present invention, the fuel economy of a vehicle is improved more effectively by using an electromotive drive device including a small motor and a low-capacity battery in an engine-driven vehicle.

DESCRIPTION OF EMBODIMENTS

Embodiments of the present invention will now be described with reference to the drawings.

Figure 1:
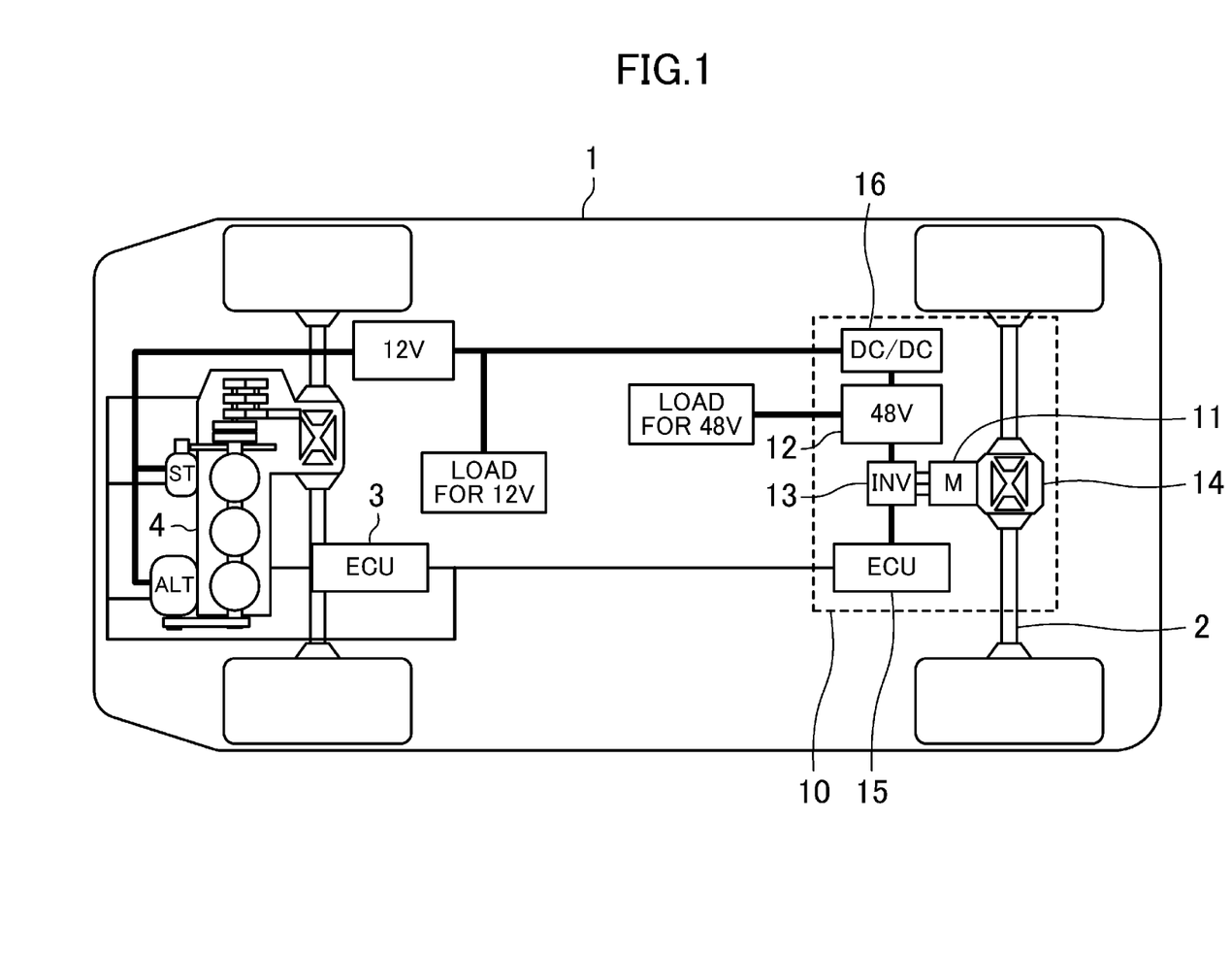
FIG. 1 A diagram illustrating a general configuration for an electromotive drive device according to an embodiment.

FIG. 1 is a diagram showing a general configuration for an electromotive drive device according to an embodiment. The electromotive drive device according to this embodiment is for use in an engine-driven vehicle. In FIG. 1, a vehicle 1 is supposed to be a front-engine, front-wheel-drive (FF) vehicle, and an electromotive drive device 10 according to this embodiment is provided for rear wheels. Front wheels are driven by an engine 4. The electromotive drive device 10 includes a motor 11 for driving an axle 2 for the rear wheels, a battery 12 storing electrical energy to rotate the motor 11, and an inverter 13 transforming power output from the battery 12 into alternating current to supply it to the motor 11 and also transforming power regenerated by the motor 11 into direct current to supply it back to the battery 12. The electromotive drive device 10 is supposed to operate at 48 V, for example. The battery 12 may be a 48V lithium ion battery. However, this is only an example of the present invention. The electrical energy stored in the battery 12 is also supplied to a load other than the motor 11 in the vehicle 1.

The electromotive drive device 10 further includes a differential gear 14, an electronic control unit (ECU) 15, and a direct current to direct current (DC/DC) converter 16. The differential gear 14 functions as a converting mechanism that transmits the rotation of the motor 11 to the axle 2 at a predetermined conversion ratio. In other words, power is transmitted from the motor 11 to the axle 2 at a conversion ratio independently of the conversion ratio at which the engine is driven. The ECU 15 receives pieces of information on the vehicle speed and the state of charge (SOC) of the battery 12 and any other piece of information, and transmits a control signal to the inverter 13 based on these pieces of information. The ECU 15 operates in cooperation with another ECU 3 provided for the engine. The inverter 13 controls the operation of the motor 11 in accordance with the control signal supplied from the ECU 15. The DC/DC converter 16 performs voltage transformation to lower 48 V that is the output voltage of the battery 12 to 12 V, for example. Note that the electromotive drive device 10 does not always include the DC/DC converter 16 as an essential element.

Note that in this example, the motor 11 is supposed to be a synchronous motor including a permanent magnet and a small motor having a rated output of 6 kW and a maximum output of about 8 kW and that the battery 12 has a capacity of about 0.24 kWh. The output of the motor used in this example is about one-tenth of that of a motor for use in a full-scale hybrid vehicle, and the capacity of the battery used in this example is also about one-tenth of that of a battery of such a vehicle.

Moreover, the differential gear 14 includes a clutch. The operation of this clutch is controlled in accordance with the control signal from the ECU 15, and the motor 11 and the axle 2 are separated from each other by disengaging the clutch. This is done in order to prevent the reverse voltage of the motor 11 that is a synchronous motor from becoming excessively high in a high-speed range. Note that if the motor 11 is an induction motor, the clutch is not always required.

Figure 2:
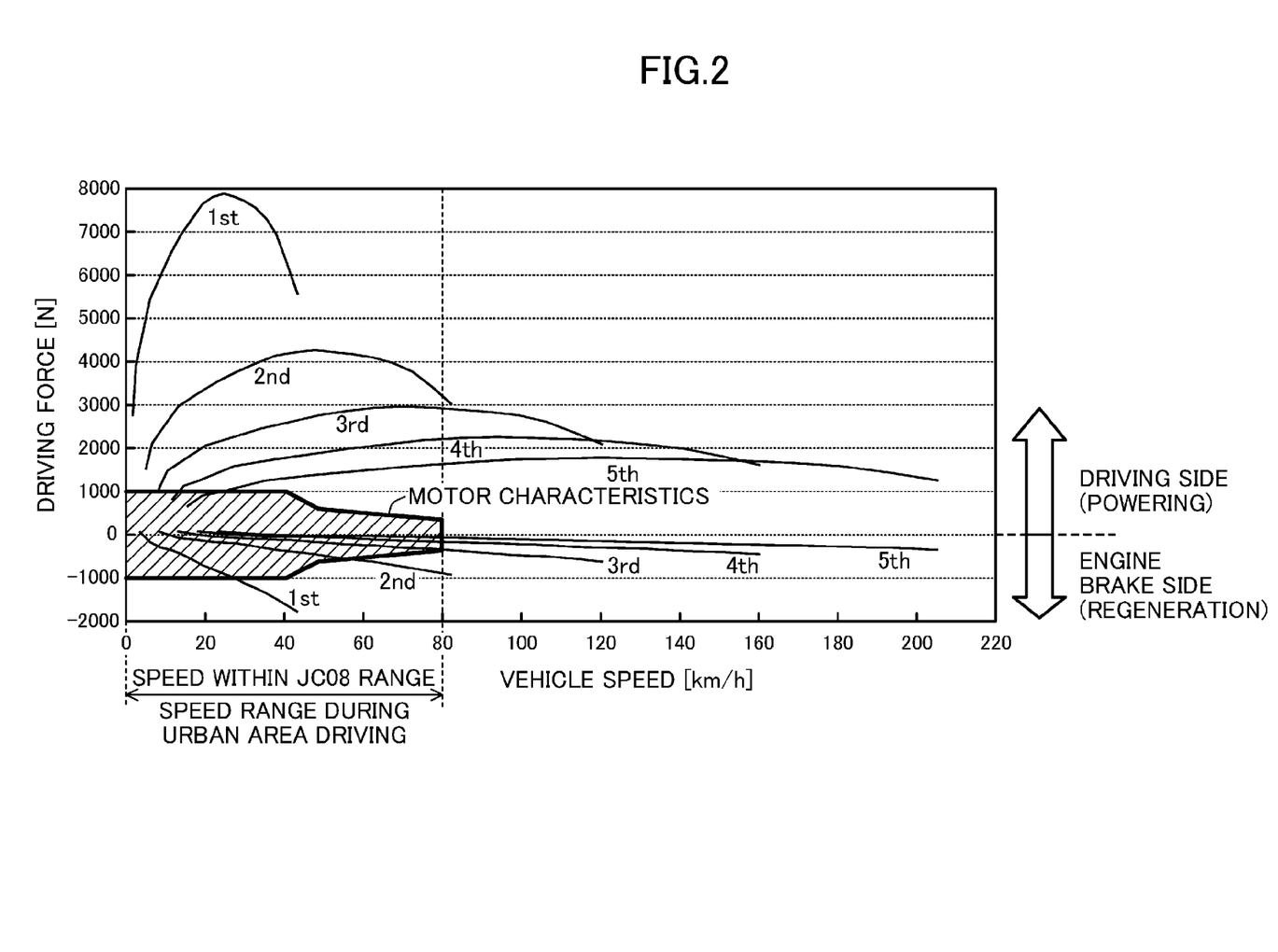
FIG. 2 A graph showing exemplary motor characteristics in an electromotive drive device according to the embodiment.

FIG. 2 is a graph showing exemplary motor characteristics in an electromotive drive device according to this embodiment. In FIG. 2, the ordinate represents the driving force [N], and the abscissa represents the vehicle speed [km/h]. In FIG. 2, the hatched region shows the characteristics of the motor 11 according to this embodiment. FIG. 2 further shows the characteristics of the engine for respective gear ratios (first, second, third, fourth, and fifth gear ratios). If the driving force is positive, the vehicle is performing powering (i.e., the vehicle is being driven and accelerated). On the other hand, if the driving force is negative, the vehicle is performing regeneration (i.e., the vehicle is being decelerated with the engine brake). Note that since the vehicle speed and the rotational speed of the motor 11 correspond to each other, the hatched region corresponds to the N-T characteristics of the motor 11 (the relationship between the rotational speed and load torque thereof).

As shown in FIG. 2, in this embodiment, the range where the motor 11 is allowed to operate is defined such that the vehicle speed is lower than or equal to 80 km/h. In other words, the conversion ratio of the differential gear 14 is determined such that when the rotational speed of the motor 11 is maximum, the vehicle speed is 80 km/h, which corresponds to the maximum speed in JC08 mode. In this embodiment, the driving force of the motor 11 is utilized in the speed range for urban area driving.

Here, it will be briefly described exactly how such a hybrid system improves the fuel economy. The effect of improving the fuel economy achieved by a hybrid system results mainly from a) high-efficiency point tracking control of an engine and b) utilization of regenerative energy. In a hybrid system in which two motors are utilized, a combination of the actions a) and b) improves the fuel economy. In a hybrid system in which one motor is used, a combination of idle reduction and the action b) improves the fuel economy in most cases. In recent years, the effect resulting from the action a) has been achieved significantly by innovation and improvement in engine technologies. Also, if an attempt is made to obtain the effect resulting from the action a) using an electromotive drive device, a large motor or a power generator will be needed. Thus, it is recommended that in an electromotive drive device including a small motor, the fuel economy be improved with emphasis on the action b), i.e., utilization of regenerative energy.

If a small motor having a power of about 8 kW were used continuously until the vehicle driven by the engine almost reaches its maximum speed, the torque would be insufficient in a normal range, and no effect would be achieved. In addition, since the thermal efficiency of an engine is sufficiently high in a high-speed range, a hybrid effect is difficult to obtain. On the other hand, to achieve an assistance effect while the vehicle that has just started is accelerating, the range in which a small motor is used may be limited to, for example, 30 km/h or less. However, the studies and simulation carried out by the present inventors almost clearly revealed that this method would not always produce the effect of reducing the fuel consumption to a satisfactory degree.

Thus, in this embodiment, the range in which the motor 11 is allowed to operate is set to be 80 km/h or less, which is approximately as high as the upper speed limit during normal driving. This thus ensures low-speed torque (driving force) even with a small motor, and effectively improves the fuel economy.

In this example, the upper speed limit in the range in which the motor 11 is allowed to operate is supposed to be 80 km/h. However, this is only an example of the present invention, and the speed limit just needs to be determined so that the motor 11 is used in the normal range, and not used in the high speed range. For example, the conversion ratio of the converting mechanism is set such that under the condition that the rated output of the motor is 15 kW or less and the rated capacity of the battery is 500 Wh or less, the upper speed limit in the range in which the motor 11 is allowed to operate is higher than 60 km/h and lower than 100 km/h. According to such settings, the vehicle's fuel economy will be improved even more effectively by providing an electromotive drive device including a small motor and a low-capacity battery for an engine-driven vehicle.

Alternatively, the upper speed limit in the range in which the motor 11 is allowed to operate may be set to be higher than 60 km/h and a half or less as high as the maximum speed of an engine-driven vehicle, for example.

Furthermore, in this embodiment, two upper speed limits, to which the motor 11 is allowed to operate, are supposed to be set separately during powering and during regeneration, respectively, in the operable range defined by the conversion ratio. This setting is done by the ECU 15.

Figure 3:
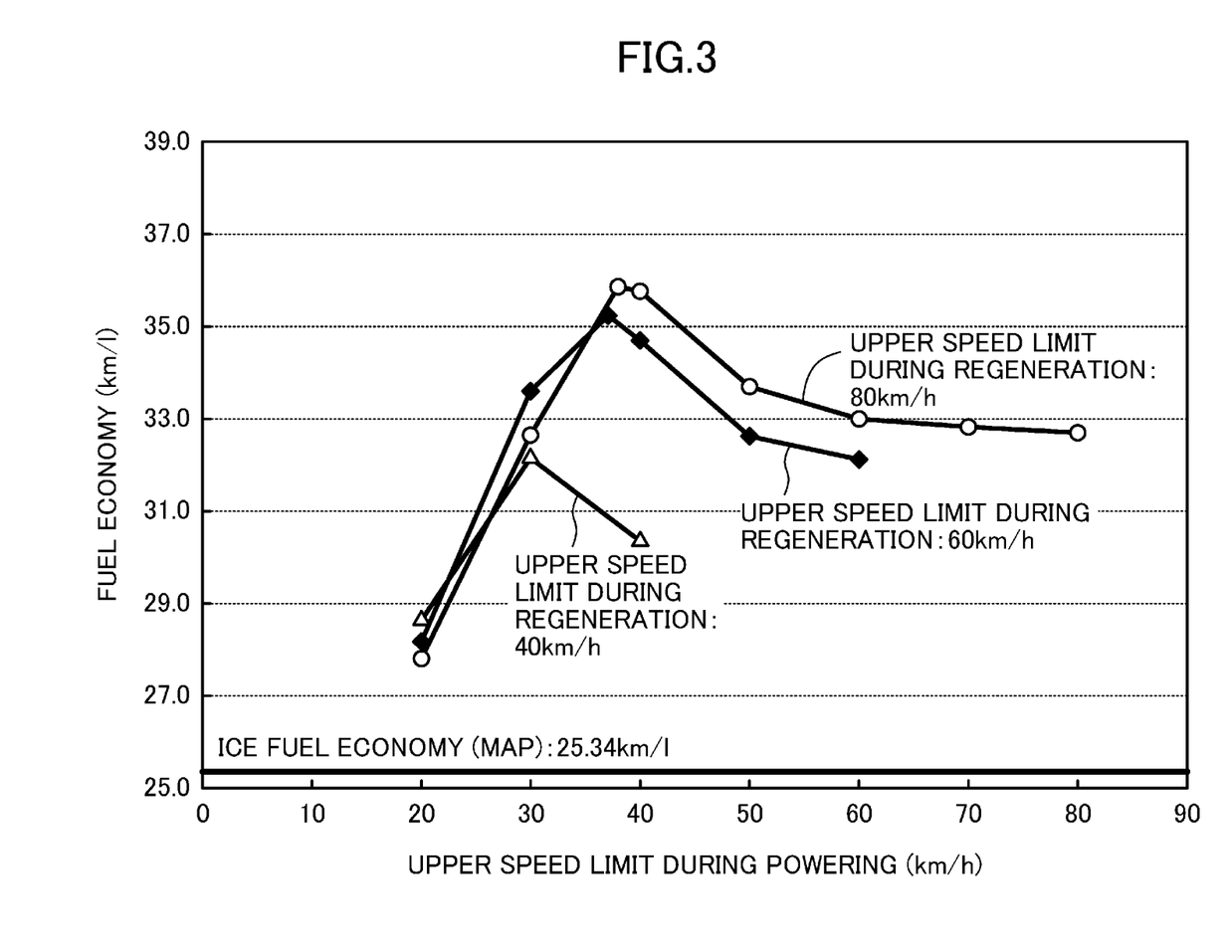
FIG. 3 A graph showing how fuel economy varies as powering and/or regeneration condition(s) is/are changed.
Figure 4:
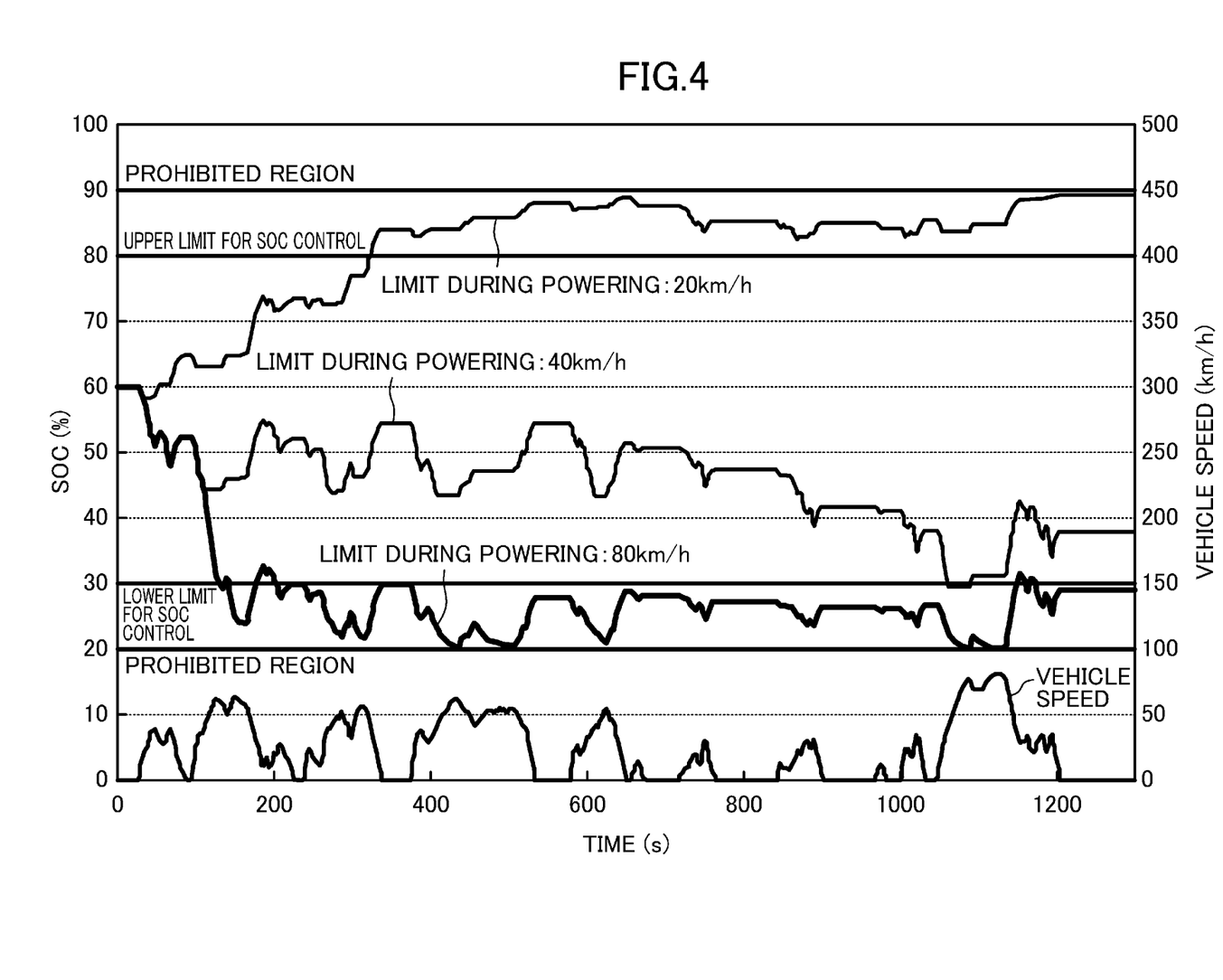
FIG. 4 A graph showing how the state of charge (SOC) of a battery varies as powering condition is changed.

FIG. 3 is a graph showing how the fuel economy varies as the powering and/or regeneration condition(s) is/are changed. The abscissa represents the upper speed limit [km/h] during powering, the ordinate represents the fuel economy [km/l], and data obtained by changing the upper speed limit during regeneration into 40 [km/h], 60 [km/h], and 80 [km/h] are plotted. FIG. 4 is a graph showing how the state of charge (SOC) of a battery varies as powering conditions are changed. The abscissa represents the time [s], the ordinate represents SOC [%], and data obtained by changing the upper speed limit during powering into 20 [km/h], 40 [km/h], and 80 [km/h] are plotted. The vehicle speeds at respective points in time are also plotted. FIGS. 3 and 4 show the results of simulations carried out by the present inventors, the motor output is 8 kW, the battery capacity is 250 Wh, and the driving pattern corresponds to JC08 mode. The fuel economy of an engine-driven vehicle (with an idle reduction system) used as a base is 25.34 km/l.

As can be seen from FIG. 3, as the upper speed limit during regeneration rises, the amount of energy that can be extracted increases, and the fuel economy thus tends to be improved. Specifically, as the upper speed limit during regeneration is increased from 40 km/h to 60 km/h and then to 80 km/h, the fuel economy is improved. On the other hand, it is not always true that the upper speed limit during powering is preferably high in terms of the fuel economy. Specifically, if the upper speed limit during regeneration is 40 km/h, maximum fuel economy is achieved when the upper speed limit during powering is about 30 km/h. However, if the upper speed limit during regeneration is 60 or 80 km/h, maximum fuel economy is achieved when the upper speed limit during powering is about 40 km/h.

Such relationship between the upper speed limit during powering and the fuel economy is associated with the SOC of the battery. Specifically, as can be seen from FIG. 4, if the upper speed limit during powering is too high, such as 80 km/h, the SOC of the battery soon decreases to the vicinity of a lower prohibited region, and a sufficient motor assistance effect cannot be achieved. Thus, the fuel economy rather declines. As can be seen from the foregoing description, the upper speed limit during powering has an appropriate range that does not include any excessively high or excessively low value, in terms of the SOC of the battery. For example, the graph in FIG. 3 shows that when the upper speed limit during regeneration is 80 km/h and the upper speed limit during powering is 36 km/h, the maximum fuel economy is achieved.

Thus, it can be said that to further improve the fuel economy, two upper speed limits, to which the motor 11 is allowed to operate, are preferably set separately during powering and during regeneration, respectively. For example, the upper speed limit during regeneration may be set to be in the vicinity of the upper speed limit in the range in which the motor 11 is allowed to operate and which is determined by the conversion ratio, and the upper speed limit during powering may be set to be lower than the upper speed limit during regeneration and to be a speed at which the vehicle frequently travels during urban area driving. By adopting such settings, use of the electromotive drive device according to this embodiment improves fuel economy even more effectively.

Figure 5:
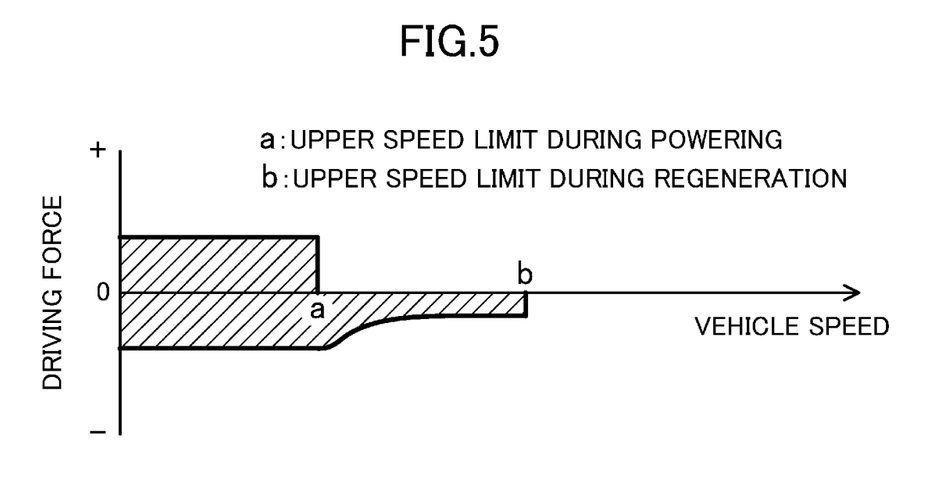
FIG. 5 A conceptual diagram showing motor characteristics of an electromotive drive device according to an embodiment.

FIG. 5 is a conceptual diagram showing exemplary motor characteristics of an electromotive drive device according to the embodiment. In FIG. 5, the upper speed limit, to which the motor 11 is allowed to operate, is set to be the speed "a" during powering and the speed "b" during regeneration, and the speed a is lower than the speed b. The speed "a" is, for example, 40 km/h, and the speed "b" is, for example, 80 km/h. Note that it is effective to set separately the upper speed limits, to which the motor is allowed to operate, during powering and during regeneration, respectively, not only under the conditions described for this embodiment, such as the range where the motor 11 is allowed to operate, the output of the motor 11, and the capacity of the battery 12, but also under other conditions.

In the example shown in FIG. 5, the ECU 15 stops driving a vehicle using the motor 11 when the vehicle speed reaches the preset upper speed limit "a" (40 km/h) during powering. In other words, the motor 11 is turned OFF at the upper speed limit "a" lower than the upper speed limit "b" during regeneration. The reason for this is as follows.

Figure 6:
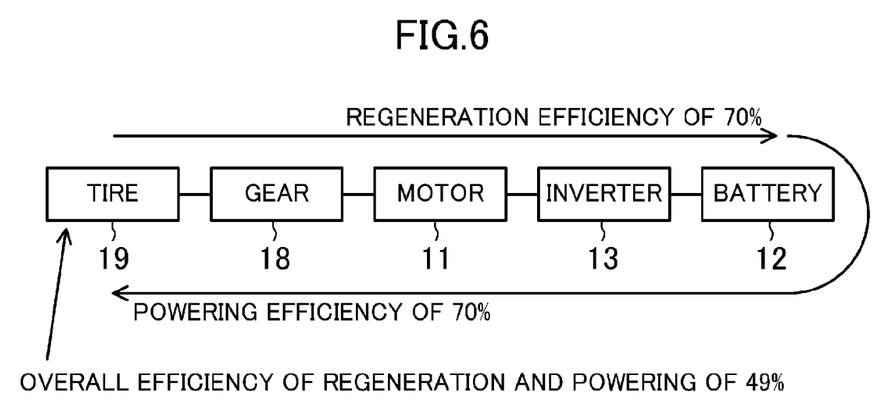
FIG. 6 A schematic diagram showing the flow of electromechanical energy from tires to a battery in an electromotive drive device according to an embodiment.

FIG. 6 is a schematic diagram showing the flow of electromechanical energy in an electromotive drive device according to the embodiment. As shown in FIG. 6, during regeneration, as mechanical energy (kinetic energy) from tires 19 is transmitted to gears 18 including a differential gear 14, to a motor 11, to an inverter 13, and then to a battery 12 in this order, the energy decreases by the losses caused by these members. In this embodiment, the overall efficiency of such a mechanical system and such an electrical system is, for example, 70%. The electric power stored in the battery 12 by regeneration is transmitted to the tires 19 in reverse direction during powering. In such a situation, the overall efficiency of the electrical and mechanical systems is also 70%, for example. Thus, 49% of the energy obtained by regeneration is transmitted to the tires 19 during powering. Therefore, in this embodiment, the upper speed limit "a" during powering is independently set to be about half of the upper speed limit "b" during regeneration in consideration of possible losses, thus accomplishing energy balance. Such an operation will enhance efficiency significantly.

In FIG. 5, two upper vehicle speed limits, to which the motor 11 is allowed to operate, are set separately during powering and during regeneration, respectively. However, values to be set separately during powering and during regeneration are not only the vehicle speeds. For example, the maximum driving forces (absolute values) of the motor 11 may also be set separately during powering and during regeneration.

Figure 7:
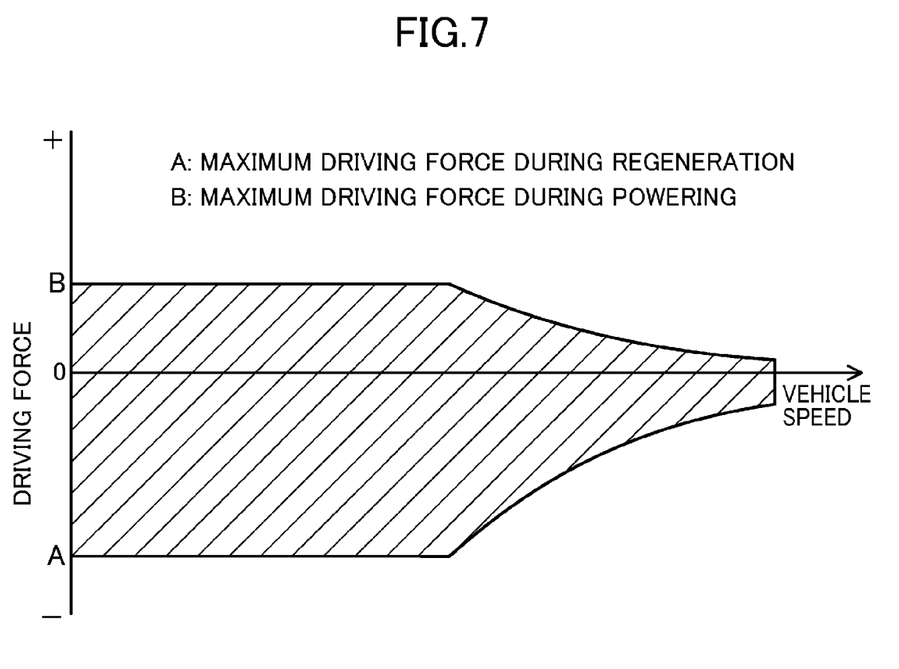
FIG. 7 A conceptual diagram showing other exemplary motor characteristics of an electromotive drive device according to an embodiment.

FIG. 7 is a conceptual diagram showing other exemplary motor characteristics of an electromotive drive device according to the embodiment. In FIG. 7, the maximum driving force of the motor 11 is set to be the driving force A during regeneration, and is limited to the driving force B during powering, and the driving force A is greater than the driving force B. The reason why such a limitation is imposed is that energy balance is to be accomplished as described with reference to FIG. 6. Such an operation will also enhance efficiency significantly.

FIG. 5 shows an example in which two upper vehicle speed limits, to which the motor 11 is allowed to operate, are set separately during powering and during regeneration, respectively. FIG. 7 shows an example in which the maximum driving forces of the motor 11 are set separately during powering and during regeneration. Optionally, both the upper vehicle speed limits, to which the motor 11 is allowed to operate, and the maximum driving forces of the motor 11 may be set separately during powering and during regeneration. Even so, energy balance is also accomplished as described above, thus achieving high efficiency.

Figure 8:
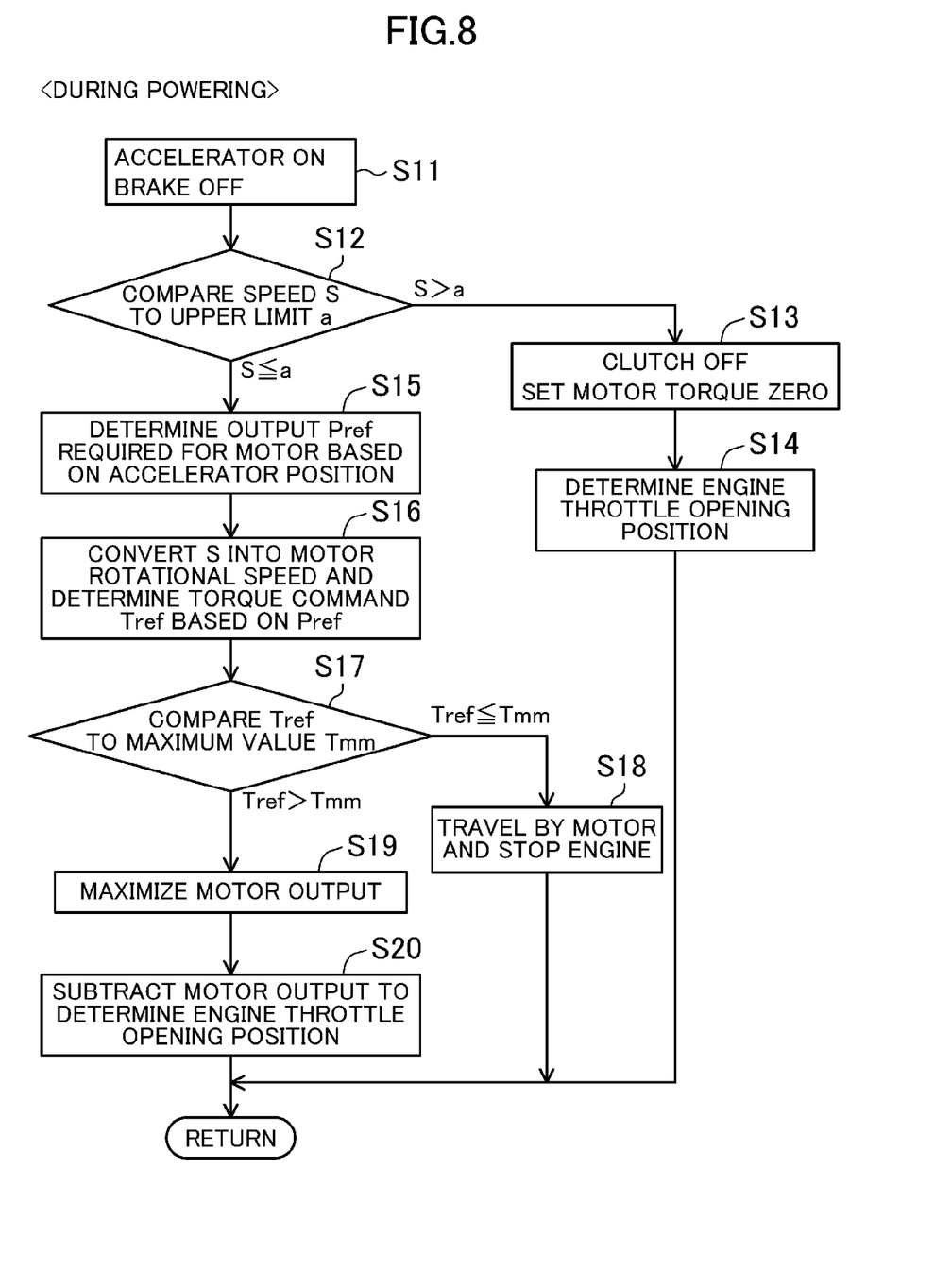
FIG. 8 An exemplary control flow during powering.
Figure 9:
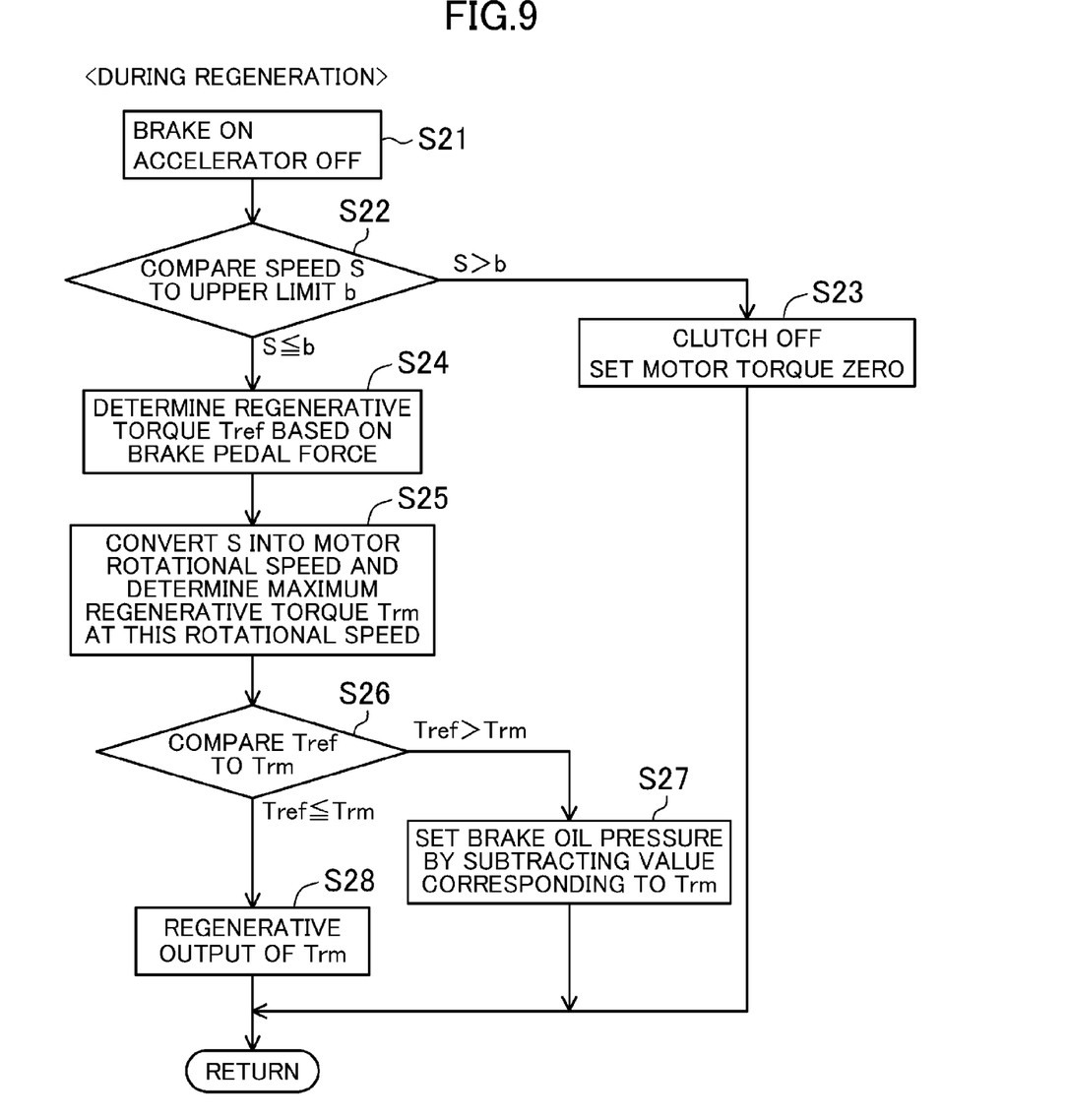
FIG. 9 An exemplary control flow during regeneration.

FIG. 8 is an exemplary control flow during powering, and FIG. 9 is an exemplary control flow during regeneration. While the control flow in each of FIGS. 8 and 9 is basically carried out by an ECU 15, control on the engine is performed by the other ECU 3 provided for the engine.

The control to be performed during powering will be described with reference to FIG. 8. The driver of the vehicle 1 presses the accelerator, and releases the brake (S11). Then, the ECU 15 receives a piece of information on the vehicle speed, and compares the current speed S of the vehicle 1 to the upper speed limit "a" for the motor 11 during powering (S12). If the speed S is greater than the upper speed limit "a", the vehicle is not driven by the motor 11, and the ECU 15 thus disengages the clutch of the differential gear 14, thereby setting the torque of the motor 11 to be zero (S13). Then, the ECU 15 determines the throttle opening position or a power command for the engine, and notifies the ECU 3 on the engine side of these determined values (S14).

On the other hand, if the speed S is lower than or equal to the upper speed limit "a", the ECU 15 determines the output Pref required for the motor based on the accelerator position (S15). Here, the calculation is performed based on a predetermined map. Then, the speed S is converted into the rotational speed of the motor 11 using the conversion ratio of the differential gear 14, and a torque command Tref is determined based on this rotational speed and the output Pref required for the motor (S16).

Then, the ECU 15 compares this torque command Tref to the maximum motor torque Tmm (S17). If the torque command Tref is less than or equal to the maximum value Tmm, the vehicle is driven by the motor 11 in accordance with this torque command Tref, and therefore, the ECU 15 sends the ECU 3 an engine stop command (S18). On the other hand, if the torque command Tref is greater than the maximum value Tmm, the ECU 15 sets the output of the motor 11 to be maximum (S19). Then, the ECU 15 subtracts the output of the motor 11 to determine the throttle opening position (S20).

Next, a control to be performed during regeneration will be described with reference to FIG. 9. The driver of the vehicle 1 presses the brake, and releases the accelerator (S21). Then, the ECU 15 receives a piece of information on the vehicle speed, and compares the current speed S of the vehicle 1 to the upper speed limit "b" for the motor 11 during regeneration (S22). If the speed S is greater than the upper speed limit "b", no regenerative operation is performed by the motor 11, and the ECU 15 thus disengages the clutch of the differential gear 14, thereby setting the torque of the motor 11 to be zero (S23).

On the other hand, if the speed S is lower than or equal to the upper speed limit "b", the ECU 15 receives a piece of information on the brake pedal force, and determines a regenerative torque Tref based on this piece of information (S24). Examples of pieces of information on the brake pedal force include a brake oil pressure, a brake stroke, and a G sensor value of the brake. Here, the calculation is performed based on a predetermined map. Then, the speed S is converted into the rotational speed of the motor 11 using the conversion ratio of the differential gear, and the maximum regenerative torque Trm at this rotational speed is determined (S25).

Then, the ECU 15 compares the regenerative torque Tref to the maximum regenerative torque Trm (S26). If the regenerative torque Tref is greater than the maximum regenerative torque Trm, the ECU 3 determines the brake oil pressure by subtracting a value corresponding to the maximum regenerative torque Trm (S27). On the other hand, if the regenerative torque Tref is less than or equal to the maximum regenerative torque Trm, the motor 11 produces a regenerative output of the maximum regenerative torque Trm.

Furthermore, the upper vehicle speed limit, to which the motor 11 is allowed to operate, may be dynamically changed in accordance with a predetermined condition. In that case, the upper vehicle speed limit may be changed both during powering and during regeneration, or either during powering or during regeneration.

Figure 10:
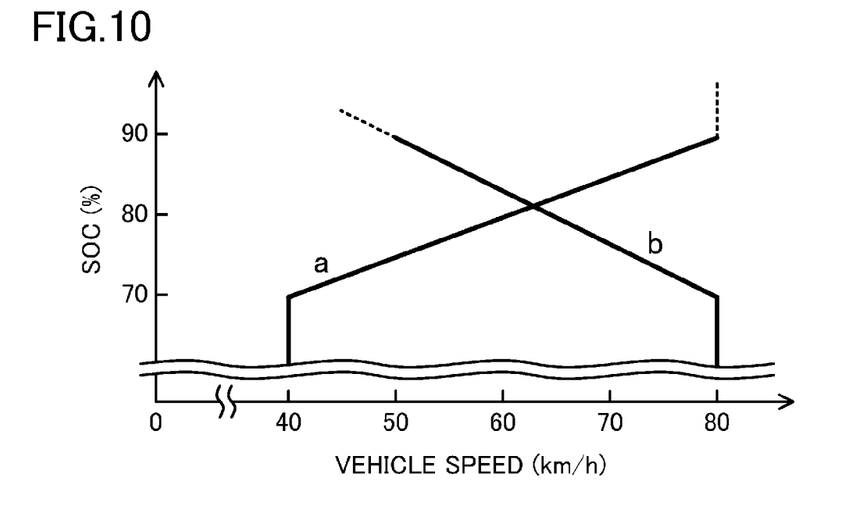
FIG. 10 Shows how the upper speed limit may be controlled during powering and regeneration according to the SOC of a battery.

Next, it will be described how the upper speed limit, to which the motor 11 is allowed to operate, may be dynamically changed according to the SOC of the battery 12. FIG. 10 shows an exemplary control of the upper speed limit according to the SOC. In the example shown in FIG. 10, if the SOC of the battery 12 is in normal state, the upper speed limit "a" for the motor 11 during powering is set to be 40 km/h, and the upper speed limit "b" during regeneration is set to be 80 km/h. The ECU 15 has received a piece of information on the SOC of the battery 12, and if the SOC increases to exceed 70%, the upper speed limit "a" during powering is gradually increased. Thus, the electrical energy stored in the battery 12 is further consumed, thereby reducing an increase in SOC. Furthermore, once the SOC exceeds 70%, the upper speed limit b during regeneration will be gradually decreased. Thus, the amount of electrical energy stored in the battery 12 will decrease, too. Such a dynamic change of the upper speed limit prevents the SOC of the battery 12 from increasing excessively. Naturally, the upper speed limit may be changed only during powering or during regeneration, and the SOC range in which the upper speed limit is to be changed, how to change the upper speed limit, and other conditions are not limited to those shown here.

Naturally, even if the SOC of the battery 12 has decreased, the same or similar control may be performed. For example, if the SOC is below 30%, a control may be performed by decreasing the upper speed limit "a" during powering or by increasing the upper speed limit "b" during regeneration.

Optionally, the torque command may be controlled according to the SOC of the battery 12. For example, after having determined the torque command Tref in Step S16 of the control flow during powering in FIG. 8, the ECU 15 receives a piece of information on the SOC of the battery 12. If the SOC is less than 40%, for example, the torque command Tref is multiplied by a coefficient of less than one, which is determined based on the SOC. In this manner, an excessive decrease in SOC may be regulated. Likewise, after the regenerative torque Tref has been determined in step S24 of the control flow during regeneration in FIG. 9, the ECU 15 receives a piece of information on the SOC of the battery 12. If the SOC is greater than 70%, for example, the regenerative torque Tref is multiplied by a coefficient of less than one, which is determined based on the SOC. Thus, an excessive increase in SOC may be regulated.

Note that the piece of SOC information used above may be estimated based on, for example, the amounts of charge and discharge current with respect to the battery 12.

Optionally, in such a configuration in which the maximum driving forces of the motor 11 are set separately during powering and during regeneration, respectively, as shown in FIG. 7, the maximum driving force of the motor 11 may be dynamically adjusted in accordance with, for example, a piece of information on the SOC of the battery 12 as in the dynamic adjustment of the upper speed limit just described above. In this case, the maximum driving force may also be changed both during powering and during regeneration, or only during powering or during regeneration. Furthermore, in a configuration in which both the upper speed limit, to which the motor 11 is allowed to operate, and the maximum driving force of the motor 11 are set separately during powering and during regeneration, both or either of the upper speed limit and the maximum driving force may be dynamically adjusted. These configurations also provide the same or similar advantages as in a situation where the upper speed limit is dynamically adjusted as described above.

In the embodiment described above, the electromotive drive device according to this embodiment is supposed to be provided for the rear wheels of the vehicle 1 that is an FF vehicle. However, this is only an exemplary application of the electromotive drive device according to this embodiment. For example, the electromotive drive device according to this embodiment may be provided for the front wheels of a front-engine, rear-wheel-drive (FR) vehicle, or may be attached to the driving wheels of an engine.

Figure 11:
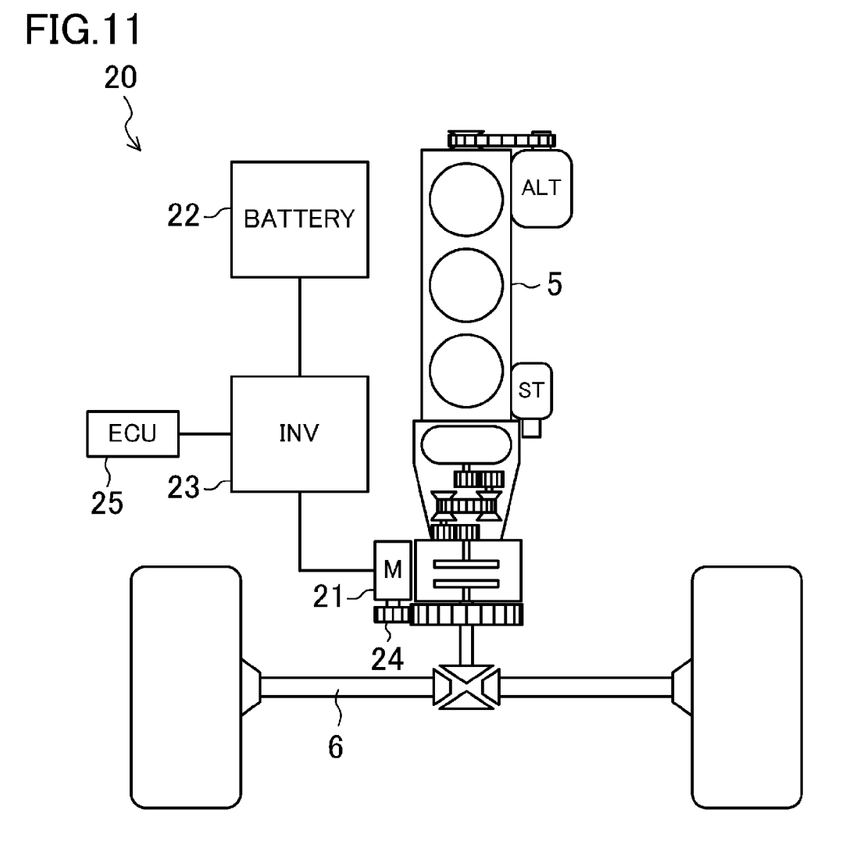
FIG. 11 Another exemplary configuration in which an electromotive drive device according to an embodiment is used.

FIG. 11 shows another exemplary application of an electromotive drive device according to this embodiment. In the configuration shown in FIG. 11, an electromotive drive device 20 according to this embodiment is attached to an axle 6 driven by an engine 5. The electromotive drive device 20 includes a motor 21 for driving the axle 6, a battery 22 storing electrical energy to rotate the motor 21, and an inverter 23 transforming power output from the battery 22 into alternating current to supply it to the motor 21, and also transforming power regenerated by the motor 21 into direct current to supply it back to the battery 22. The electromotive drive device 20 further includes a transmission 24 and an ECU 25. The transmission 24 functions as a converting mechanism that transmits the rotation of the motor 21 to the axle 6 at a predetermined conversion ratio independently of the conversion ratio at which the engine 5 is driven. The ECU 25 receives pieces of information on the vehicle speed and the SOC of the battery 22 and other pieces of information, and supplies a control signal to the inverter 23 based on these pieces of information. The inverter 23 controls the operation of the motor 21 in accordance with the control signal supplied from the ECU 25.

Figure 12:
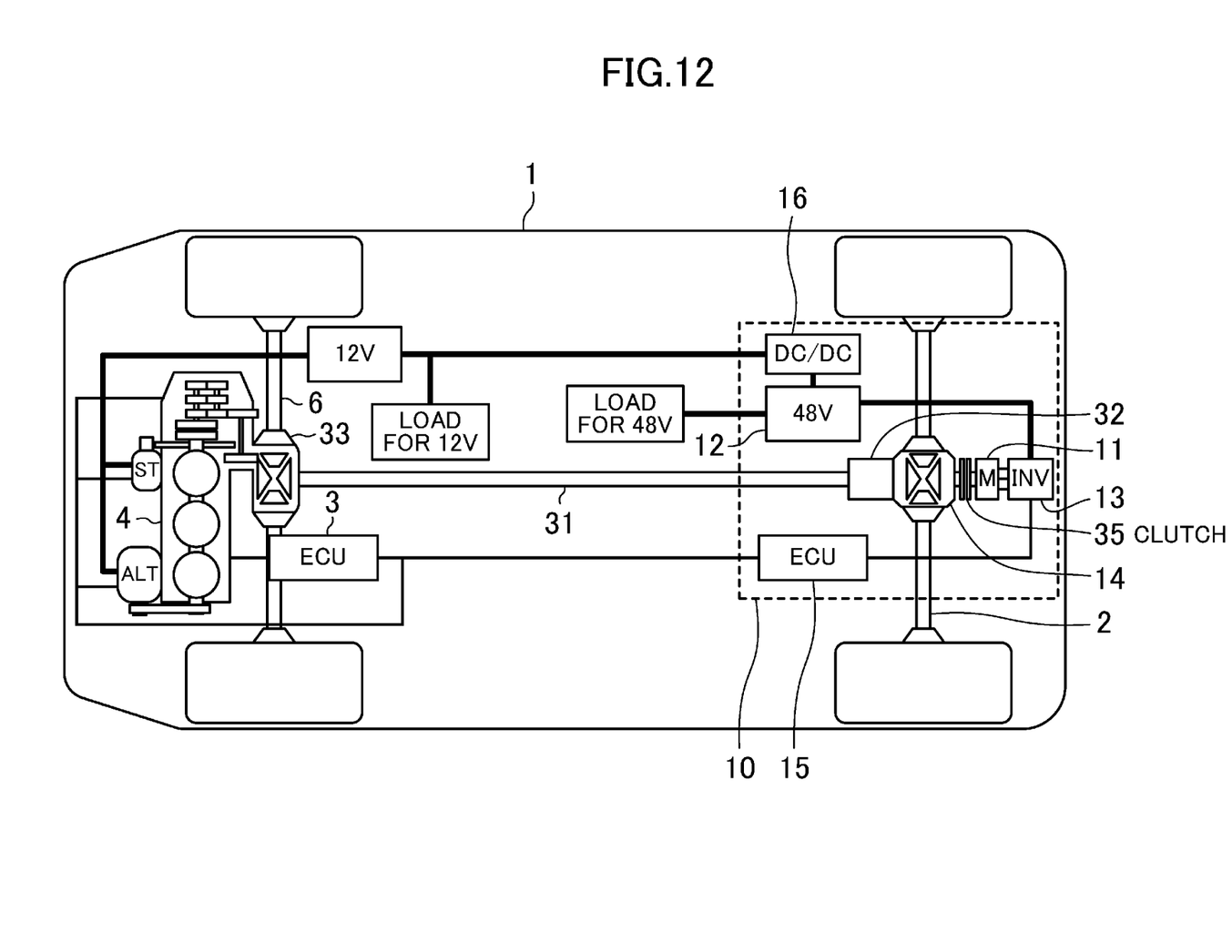
FIG. 12 Still another exemplary configuration in which an electromotive drive device according to an embodiment is used.

FIG. 12 shows still another exemplary application of an electromotive drive device according to this embodiment. In the configuration in FIG. 12, the vehicle 1 includes a propeller shaft 31, and torque transmitting means 32 operating based on the difference in rotational speed between front and rear wheels. The propeller shaft 31 and the torque transmitting means 32 are mechanically connected to a differential gear 14 provided for the rear wheels so that all of the wheels are driven by an engine 4. Specifically, the output of the engine 4 is divided into two outputs, one of which is input to a differential gear 33 for the front wheels, and a drive shaft 6 for the front wheels is directly driven by the engine. On the other hand, the other output of the engine 4 is input to the propeller shaft 31, and is transmitted through the torque transmitting means 32 to the differential gear 14 for the rear wheels. Thus, the drive shaft 2 for the rear wheels is not directly driven by the engine. Note that a motor 11 is also mechanically connected through the differential gear 14 and a clutch 35 to the drive shaft 2 for the rear wheels in the same or similar way. Thus, the motor 11 is configured to be substantially directly connected to the drive shaft 2 for the rear wheels and connected through the torque transmitting means 32 to the engine 4. In other words, the differential gear 14 transmits the rotation of the motor 11 to the drive shaft 2 that is not directly driven by the engine in the vehicle 1, and the output of the engine 4 is transmitted through the propeller shaft 31 and the torque transmitting means 32 to the differential gear 14. The electrical connection of the motor 11 may be identical or similar to the one shown in FIG. 1, and will not be described in detail.

Some characteristic operation of the configuration shown in FIG. 12 will be described. In the electromotive drive device 10 shown in FIG. 12, an ECU 15 performs a control so that when the vehicle 1 starts moving, the rotational speeds of the motor 11 and the engine 4 driven are in sync with each other. This control makes the torque input from the propeller shaft 31 to the torque transmitting means 32 substantially equal to the torque input from the motor 11 thereto within tolerance, and therefore, the torque from the engine 4 is hardly transmitted to the drive shaft 2. This prevents the drive shaft 2 from being unnecessarily driven when the vehicle starts moving on an ordinary road that is not especially slippery, thus reducing the load on the engine 4. As a result, the fuel economy of the vehicle 1 is improved.

Even if when the vehicle starts moving on a slippery road, the wheels engaged with the drive shaft 6 provided for the engine 4 slip, the wheels engaged with the drive shaft 2 driven by the motor 11 can still drive the vehicle 1. This thus improves fuel economy when the vehicle starts moving, irrespective of the road surface condition. If after the vehicle has started moving, the motor 11 stops being driven at the upper speed limit "a" during powering as shown in, for example, FIG. 5, the vehicle may be driven by mechanical four-wheel drive using only the engine 4 from then on.

Next, the operation of the vehicle 1 climbing a snowy slope will be described as another characteristic operation thereof. On sensing that the front wheels have slipped based on the difference in rotational speed between the front and rear wheels of the vehicle 1, the ECU 15 performs a control so that the direction of the force of the motor 11 becomes intentionally opposite from that of rotation of the propeller shaft 31. This causes the torque transmitting means 32 to significantly slip, and the torque of the engine 4 is actively transmitted to the drive shaft 2 for the rear wheels. As a result, the vehicle achieves high ground covering ability without making any significant slip even when climbing a snowy slope.

In a general all-wheel-drive vehicle including torque transmitting means 32 that utilizes the shearing resistance of high-viscosity oil, torque is transmitted based on the difference in rotational speed between its front and rear wheels. Thus, while the front wheels significantly slip, the torque of the front wheels is transmitted to the rear wheels, thus sometimes making the vehicle stability insufficient.

Meanwhile, in a type of a vehicle in which rear wheels are driven simply by only a motor 11 without using any mechanical connection to an engine 4, high torque is required at low speeds to ensure a high driving force required in climbing a slope. For this reason, to improve fuel economy by using regenerative energy at intermediate and high speeds and achieve gradeability at the same time, a large battery and a large motor may be used, or a motor may be further provided with a two- or three-speed transmission. Such components will all cause a significant increase in cost.

On the other hand, the configuration shown in FIG. 12 solves all of these problems. Specifically, the configuration shown in FIG. 12 provides a low-cost vehicle 1 having all of high stability, high ground covering ability, and good fuel economy by adding a small motor 11 to an all-wheel-drive vehicle including existent torque transmitting means 32.

An electromotive drive device according to this embodiment is also applicable to an in-wheel drive vehicle, for example.

DESCRIPTION OF REFERENCE CHARACTERS

1 Vehicle
2, 6 Drive Shaft
4, 5 Engine
10 Electromotive Drive Device
11 Motor
12 Battery
13 Inverter
14 Differential Gear (Converting Mechanism)
15 ECU (Control Unit)
20 Electromotive Drive Device
21 Motor
22 Battery
23 Inverter
24 Transmission (Converting Mechanism)
25 ECU (Control Unit)
31 Propeller Shaft
32 Torque Transmitting Means

The invention claimed is:

1. An electromotive drive system for use in an engine-driven vehicle, the device comprising:
   a motor for driving the vehicle and regenerating electric power;
   a battery for storing electrical energy to rotate the motor;
   an inverter for transforming electrical energy output from the battery into alternating current to supply the alternating current to the motor, and transforming electric power regenerated by the motor into direct current to supply the direct current back to the battery;
   an electronic control unit configured to control an operation of the inverter; and
   a converting mechanism for transmitting rotation of the motor to a drive shaft of the vehicle at a predetermined conversion ratio independently of a conversion ratio at which an engine is driven, wherein
   the electronic control unit is configured to set an upper vehicle speed limit, to which the motor is allowed to regenerate the electric power, to be higher than a second upper vehicle speed limit, to which the motor is allowed to drive the vehicle and to set a first maximum driving force of the motor in an absolute value during the motor driving the vehicle to be smaller than a second maximum driving force of the motor in an absolute value during the motor regenerating the electric power.

2. The electromotive drive system of claim 1, wherein the electronic control unit dynamically adjusts at least one of the first upper vehicle speed limit and the second upper vehicle speed limit, or the first maximum driving force of the motor and the second maximum driving force of the motor.

3. The electromotive drive system of claim 2, wherein the electronic control unit dynamically adjusts at least one of the first upper vehicle speed limit and the second upper vehicle speed limit, or the first maximum driving force of the motor and the second maximum driving force of the motor in accordance with a piece of information on a state of charge (SOC) of the battery.

4. The electromotive drive system of claim 1, wherein
the predetermined conversion ratio is preset so that when a rotational speed of the motor is maximum, the vehicle has a predetermined speed,
the motor has a rated output of less than or equal to 15 kW,
the battery has a rated capacity of less than or equal to 500 Wh, and
the predetermined speed is higher than 60 km/h and lower than 100 km/h.

5. The electromotive drive device of claim 4, wherein
the predetermined speed is 80 km/h.

6. The electromotive drive system of claim 4, wherein
the predetermined speed is equal to or less than 50% of maximum speed of the engine-driven vehicle.

* * * * *